Jan. 20, 1970  G. T. CARTIER  3,490,211
HIGH EFFICIENCY PARTICULATE AIR FILTER
Filed July 31, 1967  2 Sheets-Sheet 1

INVENTOR.
GEORGE THOMAS CARTIER
BY McClure & Weiser
ATTORNEYS.

INVENTOR.
GEORGE THOMAS CARTIER
BY McClure & Weiser
ATTORNEYS.

大專利 Office 3,490,211
Patented Jan. 20, 1970

3,490,211
HIGH EFFICIENCY PARTICULATE AIR FILTER
George T. Cartier, Wayne, Pa., assignor to Keystone Filter Media Co., Norristown, Pa., a company of Pennsylvania
Filed July 31, 1967, Ser. No. 657,278
Int. Cl. B01d 46/12, 46/10
U.S. Cl. 55—487                                4 Claims

ABSTRACT OF THE DISCLOSURE

A high efficiency particulate air filter (HEPA filter) of increased surface area per unit volume is disclosed and claimed. The filter comprises a frame in which is arranged a filter element comprising a series of primary pleats and a row of secondary pleats of microporous laminated filtering material having at least one supporting layer. The series of pleats is arranged in a multiplicity of series of primary pleats which are folded reversely at the end of each of said series at the fold of at least one primary pleat thereof to form a row of secondary pleats, one of each of said series of primary pleats forming one part of the fold of a secondary pleat. The secondary pleats are arranged in the frame with the series of primary pleats thereof extending between the gas inlet side and the gas outlet side of the frame.

BACKGROUND OF THE INVENTION

Field of the invention

This invention relates to high efficiency particulate air filters known in industry as HEPA, or "absolute" filters. More particularly, it relates to a HEPA filter having a greatly increased surface filter area per unit of volume and having greatly increased air filtering capacity.

Description of the prior art

HEPA filters are high efficiency gas filters and are used for the filtration of microfine particles of solids or liquids from gases in domestic, hospital, commercial and industrial locations, particularly in air conditioning systems.

A HEPA filter generally consists of a deep frame within which is supported, positioned on its edges and sealed at its upper and lower edges and sides, a continuous serpentine-like arrangement of planar filtering material, e.g., light filter paper having microporous pores. The serpentine-like arrangement consists of a multiplicity of reversely-bent folds or long pleats. Between each pair of oppositely facing surfaces of the long pleats there is inserted a corrugated spacer which serves to strengthen the vertically-standing filtering material horizontally and to prevent the pleats from collapsing together. The corrugated spacers are assembled with the corrugation of the alternate spacers running perpendicularly to the corrugations of adjacent spacers on each side. The effective filtering surface area is reduced by the area blocked by the spacers where the corrugations of the spacers cross each other and have the filter paper held therebetween. Because of the close spacing of the spacers and because of the volume occupied by them, the flow rate of air, or other gas, through the filter is considerably restricted. The depth of the filter unit is limited by the practical size of the folds and spacers and the weight added by the spacers.

SUMMARY OF THE INVENTION

The invention relates to a HEPA filter which is internally constructed to provide a great, e.g., as much as about 240%, increase in filtering surface area over that of a known HEPA filter using the same filtering material and having the same dimensions.

The internal construction of the novel HEPA filter comprises a continuous array of a multiplicity of primary pleats and secondary pleats of laminated planar filtering material, preferably consisting of an inner layer of microporous fibers held between two outer layers of porous paper, at least one of which is a stiff supporting material. The array of pleats is arranged within the usual, generally rectangular, type of frame of a filter unit in a plurality of continuous series of primary pleats. Each series of primary pleats is folded into a plurality of larger secondary pleats extending from the inlet to the outlet end of the frame. Each side of each secondary pleat comprises an equal number of primary pleats. At the end of each series of primary pleats and, thus, at the end of the side of a secondary pleat, a pair of end primary pleats is expanded sufficiently to permit a reverse fold to be made in the array and the next side of secondary pleats is placed alongside the previous side. Each side of secondary pleats thus is positioned in a head-to-tail manner with respect to the immediately preceding side of a secondary pleat. The primary pleats are expanded a predetermined distance to permit air-flow therethrough at a predetermined rate up to the maximum capacity of the filter material. The sides of secondary pleats are separated a predetermined distance to permit a predetermined rate of air passage therebetween. The beginning and end parts of the continuous array of filtering material are each sealingly fastened to an adjacent side of the filter frame, preferably by adhesive material. The top and bottom edges of the filter element are sealed against the top and bottom walls, respectively, of the frame.

DESCRIPTION OF THE PREFERRED EMBODIMENTS

Figure 1:
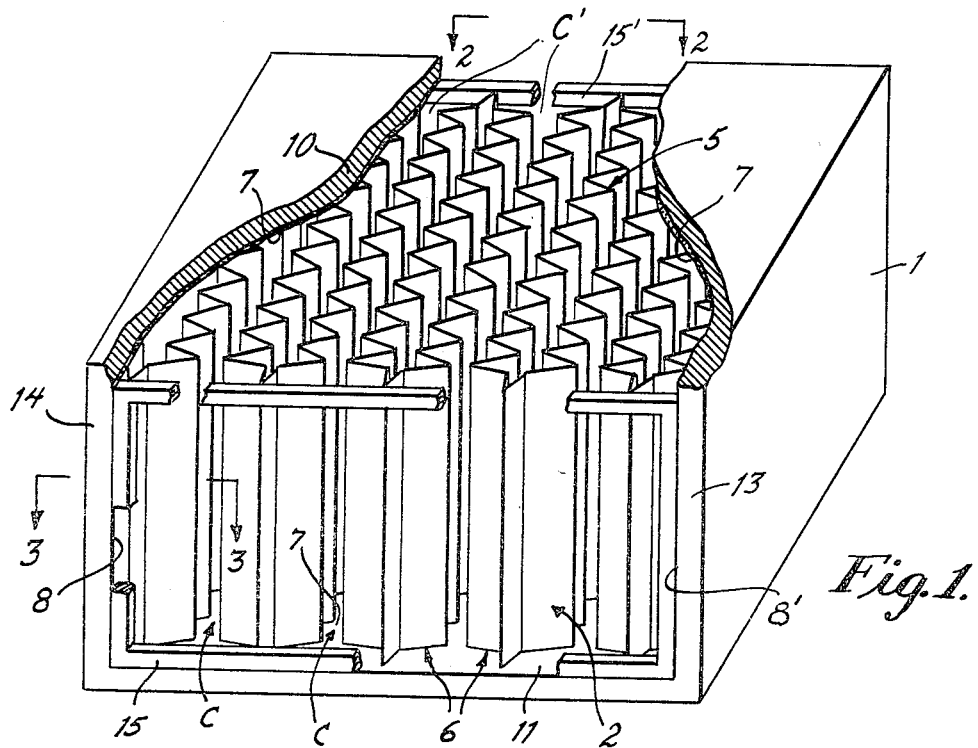
FIGURE 1 shows a partially broken away perspective view of a filter unit embodying the invention.

The filtration of air to remove filterable contaminants consisting of solid and liquid particles is an increasingly important process in the midst of the alarmingly growing problem of air pollution. The need for high efficiency particulate air filters for such purposes therefore continues to grow. The present invention has as an objective the providing of an improved HEPA filter which provides more filtering surface area per unit volume. The economic value of such a filter is obvious.

The improved filter and filter unit of the invention are more fully explained in the following description and drawing of preferred embodiments of the invention.

The filter unit of the invention shown in the drawing is designed to fit into a conventional air filtration installation provided with the usual supporting structure and suitable air intake and outlet ducts, e.g., as used in air conditioning installations for so-called industrial "white" rooms where contamination from air-borne contaminants must be kept at a minimum, or in "laminar flow" benches where air-borne microorganisms must be excluded.

The filter unit of the invention is shown installed in a frame 1, which may be made of wood, plastic or metal, preferably the latter. Filter element 2 is positioned inside the frame. The filter element 2 comprises a laminated filtering material having outer layers of porous filter paper 3, 3' and an inner layer of microporous filtering medium 4, which preferably comprises matted fiber glass fibers, but which may be any other microporous filtering medium having sufficiently fine pores. Other suitable filtering mediums include microfibers of asbestos, ceramic, synthetic inorganic polymers, organic polymers, metal or natural cellulosic materials, any and all of which advantageously may be used. Since these microfibers usually are very fine and have very little strength when formed into a thin sheet, supporting means, that is the supporting layers, are provided to hold the sheet rigid when it is used in an upright position. At least one of the outer layers 3, 3', preferably the layer 3' on the air intake side, should be stiff and strong enough to support the filtering medium, in which case the other outer layer, e.g., 3, serves merely to protect the surface of the filtering material from injury during folding, handling and use. Also, both outer layers may be made of the rigid, strong supporting material. The outer layers may have relatively great porosity compared to the inner layer, since the inner layer is to be depended upon for filtering the microfine particles from the gas passing through it. The supporting outer layer on the inlet side preferably has pores of a size small enough to permit this outer layer to serve as a pre-filter to remove coarser particles of contaminants from the air and to prevent premature clogging of the inner layer, it preferably is made of a stiff, thermo-set phenolic impregnated paper. The inner layer paper can be of the same material.

The relative sizes of the pores of the outer layers to those of the inner layer preferably are in the ratio of about 1:5, but can range from about 1:2 to 1:100. Thus, when the average pore diameter of the inner layer is 0.20 micron, that of the outer layer will range from .4 to 20 microns. Laminated filtering material and materials for forming the laminated filter element 2 of the invention are well known and are available on the market.

The filtering material preferably is obtained in the form of rolls of planar laminate having the desired filtering characteristics. For use in the filter unit of the invention, the filtering material is first formed into a series of primary pleats 5 on a conventional paper pleating machine (not shown). The folds of the pleats are made perpendicular, or transverse, to the length of the laminate in the usual manner. The width of the pleats can be determined for the particular design of filter to be constructed and folded accordingly. The width of the pleat will be controlled in part by the thickness of the filtering medium 4, which usually will range from about 1/64 to 1/4 inch, but which may be thicker or thinner than these dimensions, depending on the service, service life and ultimate efficiency desired. Primary pleats 5 having a width of about 1/4 inch to 2 inches, preferably of about 1 inch, can be advantageously used for practicing the invention.

The pleats 5 in each series of primary pleats are arranged in the filter frame 1 so that the distance $d$ between a pair of adjacent crests of the pleats 5 is more than zero and less than twice the width $w$ of the pleats. The width of a pleat 5 is herein defined as the distance from the crest, i.e., the outer edge of the crease of a folded pleat 5, to the bottom of the valley of the pleat, measured on the surface of the pleat 5 perpendicular to the line of the crease, or crest. The number of primary pleats 5 in each side of a secondary pleat 6 thus is determined by the depth of the frame 1 and by the distance $d$ of the primary pleats 5.

The folds in each of the secondary pleats 6 are arranged so that the folds are separated at least sufficiently to form intake and outlet channels $c, c'$ for air, each channel being at least sufficiently wide enough to permit free passage of air from the inlet side to the outlet side of the frame. The number of sides of secondary pleats 6, accordingly, is determined by the width $w$ and distance $d$ of the primary pleats and by the widths of the channels $c, c'$ between adjacent sides of secondary pleats 6.

The filter frame 1 may be of any appropriate dimensions and commonly will range in size from a frame measuring about 8 inches by 8 inches on the inlet and outlet faces and having a depth of about 3 inches to frames measuring 24 inches by 30 inches on the faces and having depths of about 12 inches. However, frames having face areas measuring 4 feet by 20 feet and any desired depth can equally well be used to practice the invention by means of the filter element of the invention.

The height of the interior of the frame 1 must be sufficient to receive the filter medium with the bottom edges of the primary pleats 5 resting on the inside of bottom wall 11 and with the top edges abutting against the inside of the top wall 10. A sealing adhesive compound is applied to the top and bottom edges of the filter medium in the usual manner to prevent air leakage under or over the medium.

Figure 3:
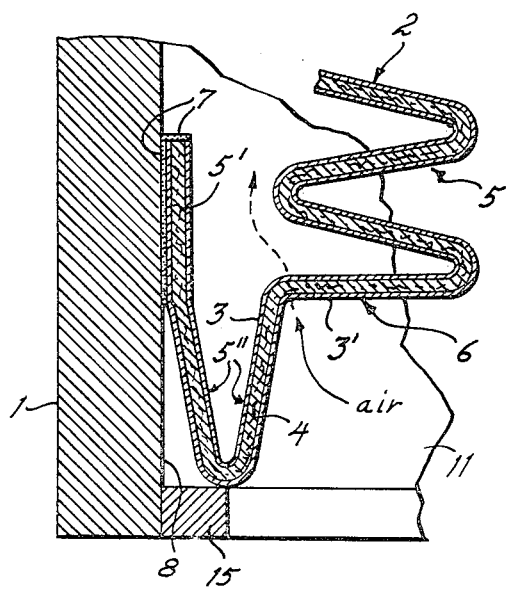
FIGURE 3 shows a fragment of a schematic corner of the filter unit taken along the line 3—3 of FIGURE 1 and viewed in the direction of the arrows, and illustrating adhesively sealing of one end of the laminated filter medium to the frame.

In one embodiment of assembling the filter element 2 in filter frame 1, a pleat 5' of the filtering material is severed along its crease, or crest, and is folded back substantially as shown in FIGURE 3. A layer of adhesive material 7 is applied to the outer surface and end of pleat 5' and the pleat is adhered to the inside wall 8 of frame 1 near the inlet substantially as shown in FIGURE 3. The first row of primary pleat in a secondary pleat 6 then is aligned parallel to the wall from the inlet side to the outlet side of the frame 1. This row is separated from the wall 8 by the distance of an expanded pleat 5''. In this preferred embodiment, air flowing through the filtering element 2 in the direction of the arrows in FIGURE 3 is provided an unobstructed passageway along the wall 8.

The filtering material array then further is arranged in the filter frame 1 by arranging a predetermined number of primary pleats in a continuous series in each row, reversing the direction of the array at the end of each row by expanding at least one or more, preferably two, pleats 5, aligning the next series of pleats 5 in a row alongside the first row a predetermined distance equal to the desired channel $c$ and continuing in this manner from the inlet to the outlet sides of the frame until the inside volume of the frame 1 from side to side is filled with the amount of filter element 2 predetermined necessary to provide a predetermined filtering surface area. The filtering surface area of the filter element 2 is substantially equal to that of the surface area of the outer layer 3' of the filtering material. The last pleat of the array of filtering material is severed from the roll of stock material and attached to the other inside wall 8' of the frame 1 in the same manner as the beginning pleat 5' was attached. Attachment can be made at either the inlet side or the outlet side of the frame 1.

Figure 4:
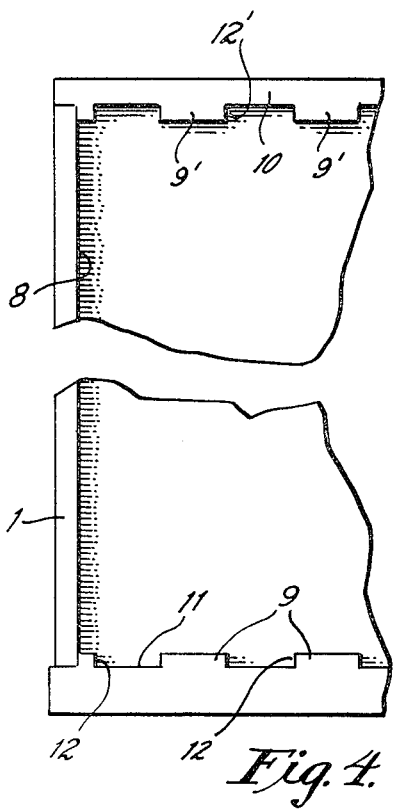
FIGURE 4 shows a filter unit frame with built-in spacers for forming channels between rows of secondary pleats.
Figure 5:
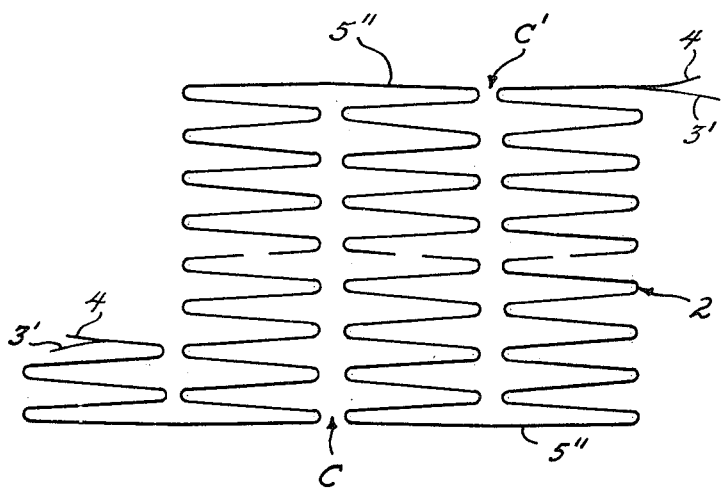
FIGURE 5 shows a fragmentary schematic view of a filter element with single expanded primary pleats at the ends of each series in each side.

The air intake channels $c$ preferably run substantially parallel to each other from the inlet side to the outlet side of the frame 1. The filtering material preferably will be sufficiently rigid so that with a relatively high ratio of distance $d$ to width $w$ of the primary pleats 5, e.g., 1:10, the sides of secondary pleats 6 will be aligned in straight lines. However, when a relatively flexible filtering material is used to construct the filtering element 2, and a relatively low ratio of distance $d$ to width $w$ is used, the sides of secondary pleats 6 may tend to flex and to rub together. In an embodiment designed to preclude this happening, the rows of secondary pleats are preferably separated by including spacing runner strips 9, 9', substantially as shown in FIGURE 4, at the inner sides of the top 10 and the bottom 11 walls of the frame 1 and by positioning the edges of the rows of pleats 6 between the strips. The runner strips 9, 9' preferably are made to have the width of the desired channel c. Their height need be only high enough to hold the rows in alignment during maximum air flow operation. A height of about ¼ to ½ inch will usually suffice. The runner strips 9, 9' preferably are formed integral with the top wall 10 and the bottom wall 11, as by cutting away parts of the wall to form recesses 12, 12' which each have a width equal to the thickness of a side of secondary pleats 6. The entire top and bottom walls 10, 11 also can be extruded from a rigid synthetic plastic material with the runner strips 9, 9' and with recesses 12, 12' being formed simultaneously therewith.

In a preferred embodiment for assembling the filter unit, the filter element 2 is folded into the desired configuration in a forming jig of which the bottom wall 11 of FIGURE 4 is a part. Adhesive sealing material is placed in the recesses 12 and the rows of secondary pleats 6 comprising the series of primary pleats 5 are arranged therein. Adhesive sealing material is then applied on the top edge of the filter medium. A top wall 10 as shown in FIGURE 4 is then placed on top of the top edge of the filter medium with the strips 9' between the rows and the edges of the rows in recesses 12', and pressure is applied to form a tight seal. Adhesive sealing material is then applied to end pleat 5' and its corresponding pleat at the other end of the filter element 2. Sidewalls 13 and 14 are then pressed against the adhesive-covered pleats and between the top wall 10 and bottom wall 11 to complete the frame around the filter element 2. Retaining frames 15, 15' preferably then are inserted along the inner side of the walls of the frame 1, one in front of and the other behind the filter element 2, to further secure it within the frame 1. A protective wire screen (not shown) may be placed between the frames 15, 15' and the filter element 2 to protect the filter material from accidental puncture.

The adhesive material used to adhere and seal the element 2 preferably is a vinyl plastisol adhesive of a plastisol-grade polyvinyl chloride resin thoroughly dispersed in a dioctyl phthalate plasticizer in a 1:1 proportion by weight of plasticizer to resin. Such adhesives and their use are known. See, for example, U.S. 3,164,506.

In place of using adhesive at the sides of the frame 1 to attach the ends of the filter element 2 to the side walls 13 and 14, one can also clamp the ends between folded metal clamps which can be screwed to the inside walls 8 and 8' and caulked with caulking compound.

Figure 2:
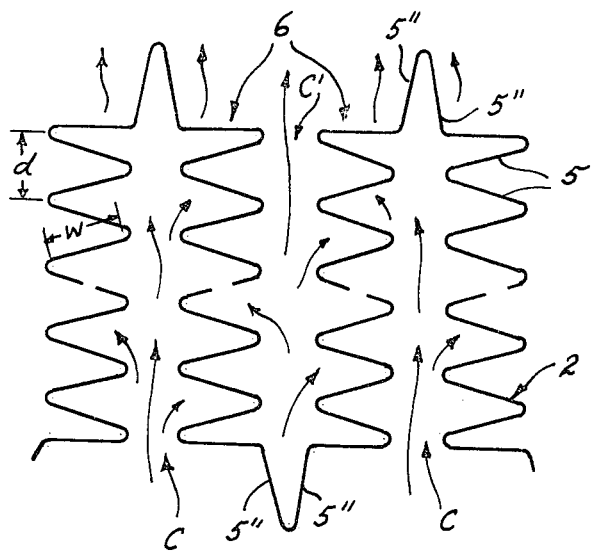
FIGURE 2 shows a fragmentary schematic view of the filter element of the filter unit taken along the line 2—2 of FIGURE 1 and viewed in the direction of the arrows.

While the adhesive material is used mainly for its adhering properties, it also serves as a caulking material, but is less likely to give way under high pressures of air flow, than ordinary caulking material The filter unit of the present invention is especially advantageous for filtering contaminated air and other gas because the novel structure of the filter medium 2 of the unit results in a highly increased filtering surface area being made available within the confines of the frame. This result can be understood more clearly by visualizing the flow of air through the filter element 2. Referring to FIGURE 1, incoming air enters the filter element 2 from the front of the filter unit. Referring to FIGURE 2, it is seen that air impinges not only on the frontal surface area of the filter material of the element, but enters each of the channels c. The air filters through the filter material in the frontal area. It also filters through each surface of each pleat 5 which is covered by the outer layer 3' of the filtering material. The incoming air is purified as it passes through the microporous layer 4 and leaves the filtering material through outer layer 3. It then passes into air outlet channels c' from which it flows from the filter unit. Passage of unfiltered air through the back of the filter element 2 is prevented by the expanded primary pleats 5 at the back surface area of the filter medium.

The filtering surface area of the filter element 2 thus, in effect, is the virtual equivalent in surface area of the entire surface area of the filtering material laminate before it was folded into its pleated arrayed form. Moreover, the air pressure on the filter element 2 is well distributed by the many channels c. In contrast to the pleated HEPA filter of the prior art, in which the pleats must be supported by the spacing inserts, the present filter permits the pleats to be expanded or contracted during assembly to any desired spacing for varying airflow rate.

A comparison of filtering surface area of a commercially available standard HEPA, or so-called "absolute," filter was made with that of a filter unit of the invention having the same dimensions as the standard unit and using the same filtering material. The dimensions of each unit were 24 inches by 24 inches by 11½ inches deep. The maximum available filtering surface area of the standard filter element was measured and was found to be 230 square feet. The filter material of the standard filter element was a single continuous layer, about ½₂ inch thick and 24 inches high, of microfiberglass which was reversely folded and had corrugated spacers between the folds.

A filter element 2 of the invention was assembled into a frame having dimensions of 24 inches by 24 inches by 11½ inches deep. The filter material of the filter element was a laminate made of a continuous inner layer of microfiberglass, Hollingsworth and Vose grade H930, and two continuous outer layers of resin-impregnated porous paper. The layers were each about 24 inches high. The outer layers were provided with a commonly used pattern of a series of ridges and grooves running lengthwise on the outer surfaces to form air passages between adjoining sheets in the event two outer surfaces press against each other. The inner layer of microfiberglass was about ½₂ inch in thickness, and the outer layers were each about ½₆₄ inch in thickness, making the thickness of the laminate about ½₆ inch. The filter material was pleated transversely with primary pleats 5 having a width $w$ of about one inch. The filter material was folded into a filter element 2 consisting of 20 sides of secondary pleats 6, each side forming one-half of the pleat. Each side was made up of a series of 66 primary pleats. The last half-fold of the primary pleat in each row was reversely folded and expanded to open the pleat substantially completely and to form the first half-fold of the succeeding adjacent row. The channels c and c' between the rows were about ³⁄₁₆ inch or less in width and about 24 inches in height. The total available filtering surface area of the filter element 2 was found to be 440 square feet.

The maximum air flow rate through the standard HEPA filter at ½ inch water drop was about 600 c.f.m. the maximum air flow rate at ½ inch water drop through the improved HEPA filter of this invention was about 1408 c.f.m., or more than two times that of the standard filter.

The structure of the filter element 2 of the invention is such that it can withstand a heavy pressure placed on its top side, i.e., on the ends of the primary pleats 5. Thus, a cylinder of the pleated filter element made with the 24 inch high microfiberglass laminate filtering material described above and measuring 4 inches in diameter withstood a load of 120 pounds before bending. The surface of the pleated filter material withstood a hydraulic head of 15 p.s.i.g. before rupturing. In contrast to the above, the standard HEPA microfiberglass filter material provided with the usual corrugated spacers rupturing under a hydraulic head of less than one pound placed on its surface.

The present invention has the additional advantage that the filtering surface area is not limited by the available frontal surface area where dimensional depth for a deeper filter and frame is available. For example, the above described conventional HEPA filter unit is made 11½ inches deep. It may not be made much deeper without adversely affecting its efficiency and without increasing the bulk of corrugated spacers which take up a large part of the volume of the conventional unit and add to its weight. Therefore, its filtering surface area can be increased mainly by increasing its frontal dimensions from 24 inches by 24 inches to larger dimensions. The filter unit of the present invention does not suffer from this obvious disadvantage. In the novel filter unit, the length of the secondary pleats 6 can be extended to almost any desired dimension, for example, to two feet, four feet, or even longer, thus increasing the filtering surface area by increasing the depth without increasing the frontal surface area and without significantly impairing the utility of the filter. To accommodate the greater flow rate of the air, the channels $c$ and $c'$ can be made wider as necessary.

While the sides of secondary pleats have been described and illustrated in parallel, straight line array, it is to be understood that the rows can also be arranged in non-parallel array, and that the rows can be curved or waved, and all need not be of the same length. Also, although the frame of the filter unit and the filter medium is shown as being rectangular, it is to be understood that the frame can be of other polygonal form or even cylindrical and the filter element formed to fit within the polygon or cylinder. For example, a cylindrical form of filter element can be made by cutting an assembled square-faced filter element along a circle marked on the frontal surface. The resulting drum-shaped filter element can then be inserted and sealed in a cylindrical duct to obtain the advantages of the improved HEPA filter unit. As is evident, the heights of the primary pleats 5 need not all be of the same dimension so long as the edges are sealed to prevent air leakage around them.

The novel filter element and filter unit of the invention are especially advantageous for the purification of air. However, they may also be used advantageously for the filtration of other fluid material whether gaseous or liquid in form, by use of suitable filter material which can withstand the physical and chemical effects of the gas or liquid fluid. In each case, the advantages of greater filtering surface area per unit volume with a minimum of restriction to flow will be obtained as benefits.

The claimed invention:

1. A high efficiency particulate air filter unit comprising a parallelepiped frame having two open opposite ends functioning as inlet and outlet for said unit and having top, bottom and sides formed of impervious walls, a single continuous filter sheet extending within and across the frame, said sheet comprising at least three layers laminated to each other, said sheet being pleated transversely along its length into a continuous series of primary pleats, said pleats being substantially the same size, the pleated sheet being folded into a plurality of larger secondary pleats extending from the inlet end to the outlet end of the frame, each side of each secondary pleat comprising an equal number of primary pleats and the ends of each sides of of secondary pleats being expanded sufficiently to form reverse folds said folds being situated at the crests of each secondary pleat and including primary pleats extending to the corresponding open end of the frame, the sides of the secondary pleats being parallel to the sides of the frame, the sides of the secondary pleats being spaced apart to form alternate intake and output channels, said intake channels opening at the inlet end and the output channels opening at the gas outlet end, the ends of the filter sheet being adhesively sealed to opposite sides of the frame, and the filter sheet top and bottom edges being adhesively secured to top and bottom walls of the frame.

2. The filter element of claim 1 in which the primary pleats have a width of about ¼ inch to 2 inches.

3. The filter element of claim 1 in which said laminated filter medium comprises at least one inner layer of microporous filter material disposed between at least two outer layers of supporting filter material of greater porosity.

4. The filter element of claim 1 in which the distance $d$ between a pair of adjacent crests of primary pleats is more than zero and less than twice the width $w$ of the pleats.

References Cited

UNITED STATES PATENTS

| | | | |
|---|---|---|---|
| 2,198,190 | 4/1940 | Vokes | 55—500 |
| 2,980,208 | 4/1961 | Neumann | 55—500 |
| 3,025,963 | 3/1962 | Bauer | 210—493 |
| 3,158,458 | 11/1964 | Babbitt | 55—499 |
| 3,222,850 | 12/1965 | Hart | 55—500 |
| 3,248,942 | 4/1966 | Burke | 55—387 |
| 3,252,270 | 5/1966 | Pall et al. | 55—486 |
| 3,273,321 | 9/1966 | Bauder et al. | 55—499 |
| 3,372,533 | 3/1968 | Rummel | 210—493 |
| 3,402,531 | 9/1968 | Farr | 55—499 |

FOREIGN PATENTS

| | | |
|---|---|---|
| 932,849 | 12/1947 | France. |
| 1,275,496 | 10/1961 | France. |
| 798,765 | 7/1958 | Great Britain. |
| 880,427 | 10/1961 | Great Britain. |
| 803,101 | 6/1936 | France. |

HARRY B. THORNTON, Primary Examiner

B. NOZICK, Assistant Examiner

U.S. Cl. X.R.

55—497, 500, 501, 514, 521, 527; 210—493